United States Patent
Li et al.

(10) Patent No.: US 10,547,267 B2
(45) Date of Patent: Jan. 28, 2020

(54) VOICE COIL MOTOR PULSE WIDTH MODULATION-TO-LINEAR SMOOTH TRANSITION CONTROL

(71) Applicant: Texas Instruments Incorporated, Dallas, TX (US)

(72) Inventors: Qunying Li, Allen, TX (US); Joao Carlos Felicio Brito, Murphy, TX (US); Wenxiao Tan, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/331,213

(22) Filed: Oct. 21, 2016

(65) Prior Publication Data

US 2018/0115268 A1  Apr. 26, 2018

(51) Int. Cl.
H02P 7/00 (2016.01)
H02P 25/034 (2016.01)
H02P 7/03 (2016.01)

(52) U.S. Cl.
CPC ............. H02P 25/034 (2016.02); H02P 7/04 (2016.02)

(58) Field of Classification Search
CPC .................................. H02P 7/04; H02P 25/034
USPC ........................................................ 318/119
See application file for complete search history.

(56) References Cited

U.S. PATENT DOCUMENTS

| 7,006,320 | B1 * | 2/2006 | Bennett | G11B 19/20 360/70 |
| 7,548,392 | B1 * | 6/2009 | Desai | G11B 21/12 360/75 |
| 2005/0174673 | A1 * | 8/2005 | Price, Jr. | G11B 5/09 360/55 |
| 2005/0218846 | A1 * | 10/2005 | Moser | G11B 19/20 318/376 |
| 2011/0090775 | A1 * | 4/2011 | Miyagoe | G11B 5/5582 369/47.38 |

* cited by examiner

*Primary Examiner* — Bickey Dhakal
*Assistant Examiner* — Gabriel Agared
(74) *Attorney, Agent, or Firm* — Lawrence J. Bassuk; Charles A. Brill; Frank D. Cimino

(57) ABSTRACT

Methods and apparatus providing a smooth transition from a pulse width modulation mode to a linear mode to drive a voice coil motor are disclosed. An example apparatus includes an H-bridge; a pulse generator to generate a pulse when the voice coil motor driver transitions from pulse width modulation mode to linear mode; a first boost circuit to, when the pulse is generated, increase a first current being applied to a first gate of a first transistor in the H-bridge, the increase in the first current enabling the first transistor; and a second boost circuit to, when the pulse is generated, provide an additional path to ground from a node coupled to a second gate of a second transistor of the H bridge, the path to ground corresponding to a voltage drop that disables the second transistor.

18 Claims, 8 Drawing Sheets

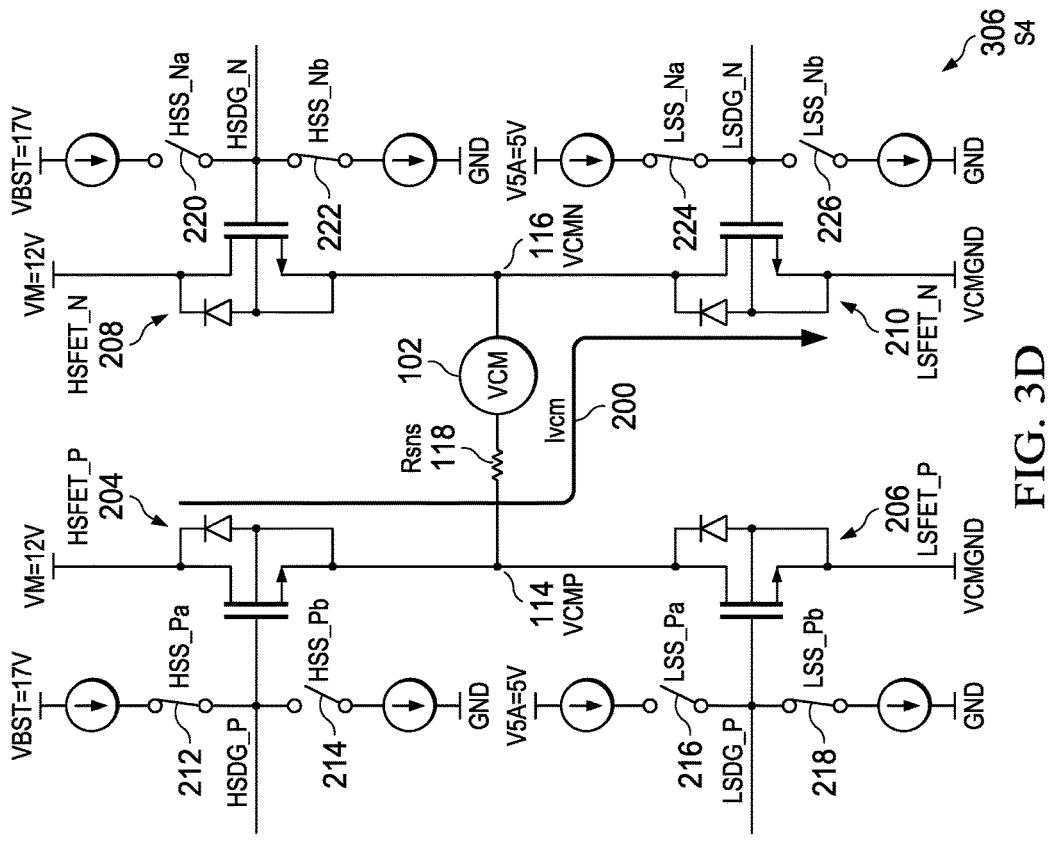
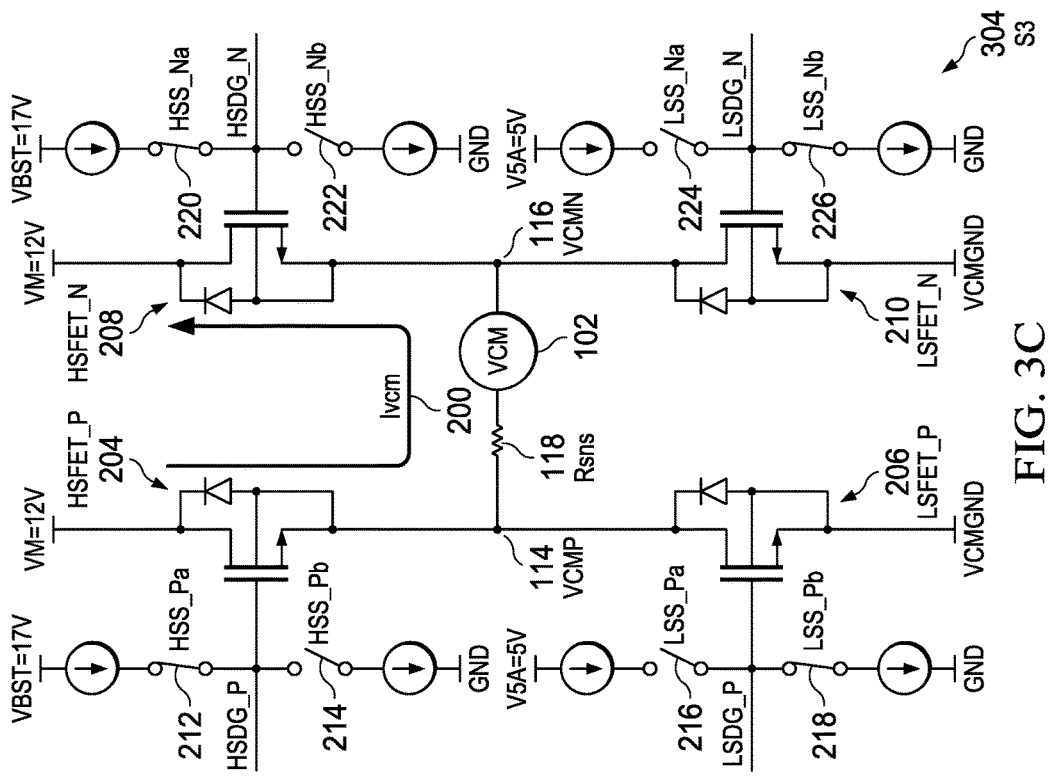
FIG. 3D
FIG. 3C

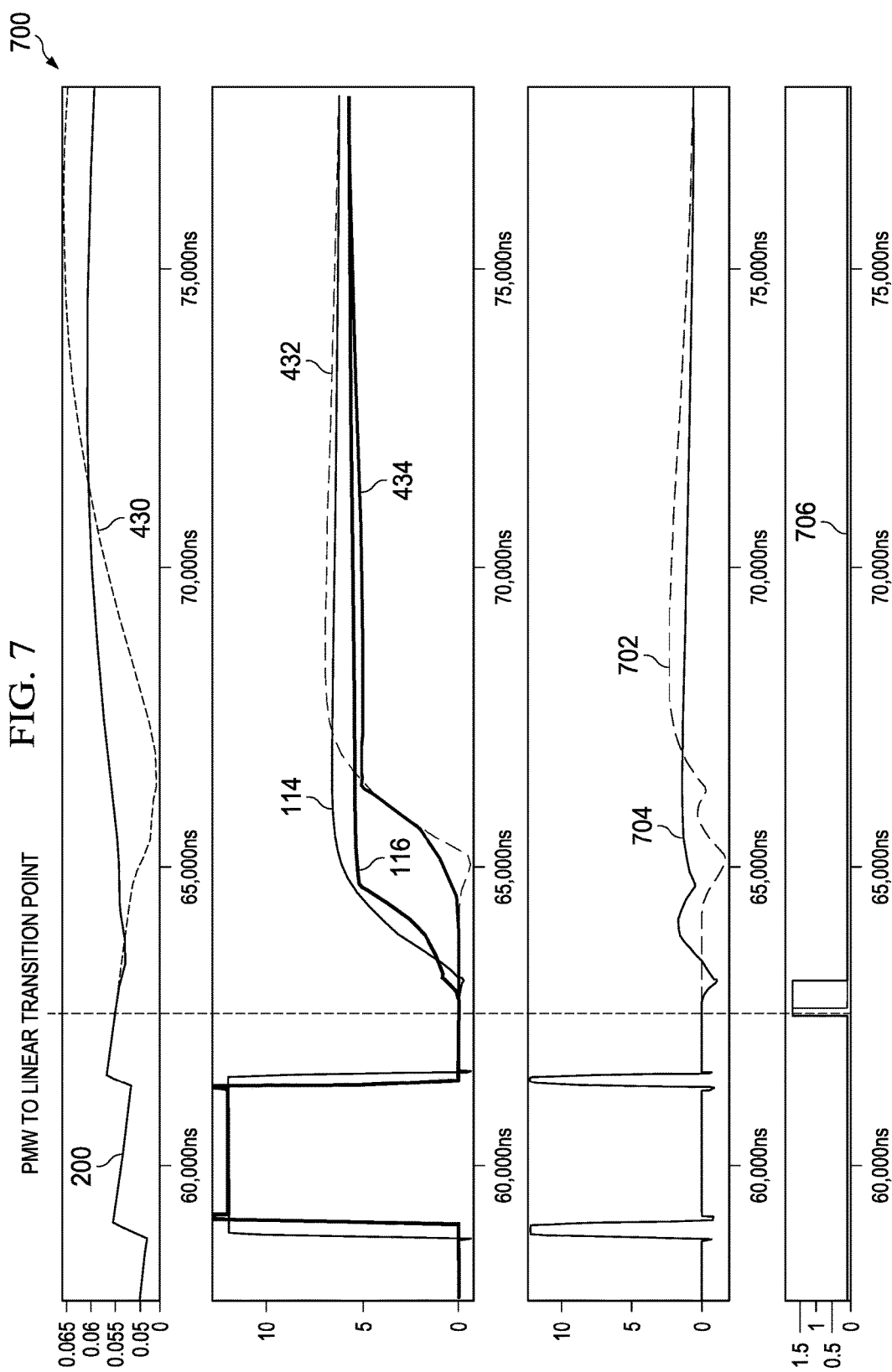

VOICE COIL MOTOR PULSE WIDTH MODULATION-TO-LINEAR SMOOTH TRANSITION CONTROL

FIELD OF THE DISCLOSURE

This disclosure relates generally to voice coil motor control and, more particularly, to methods and apparatus providing smooth transition from a pulse width modulation mode to a linear mode to drive a voice coil motor.

BACKGROUND

A hard disk drive is a storage device to which digital data can be written or from which digital data can be read. In some examples, the hard disk drive includes a voice coil motor driver to control a voice coil motor that drives an actuator to read and/or write the digital data. The voice coil motor driver may control the voice coil motor using a pulse width modulation mode or a linear mode. The pulse width modulation mode is less power consuming, but less accurate and the linear mode is more accurate, but more power consuming. Voice coil motor drivers transition between pulse width modulation mode and linear mode based on the accuracy necessary to perform an operation.

SUMMARY

Examples disclosed herein provide a smooth transition from a pulse width modulation mode to a linear mode to drive a voice coil motor. An example apparatus includes power transistors forming an H-bridge. The example apparatus further includes a pulse generator to generate a pulse when the voice coil motor driver transitions from pulse width modulation mode to linear mode. The example apparatus further includes a first boost circuit to, when the pulse is generated, increase a first current being applied to a first gate of a first transistor in the H-bridge, the increase in the first current enabling the first transistor. The example apparatus further includes a second boost circuit to, when the pulse is generated, provide an additional path to ground from a node coupled to a second gate of a second transistor of the H bridge, the path to ground corresponding to a voltage drop that disables the second transistor.

BRIEF DESCRIPTION OF THE DRAWINGS

FIGS. 3A, 3B, 3C, and 3D illustrate a voice coil motor current generated by the example voice coil motor driver of FIG. 1 during a pulse width modulation mode.

FIG. 7 is a graph illustrating a comparison of the transition response using the conventional voice coil motor driver of FIG. 4 and a transition response using the voice coil motor driver of FIG. 6.

The figures are not to scale. Wherever possible, the same reference numbers will be used throughout the drawing(s) and accompanying written description to refer to the same or like parts.

DETAILED DESCRIPTION

Figure 1:
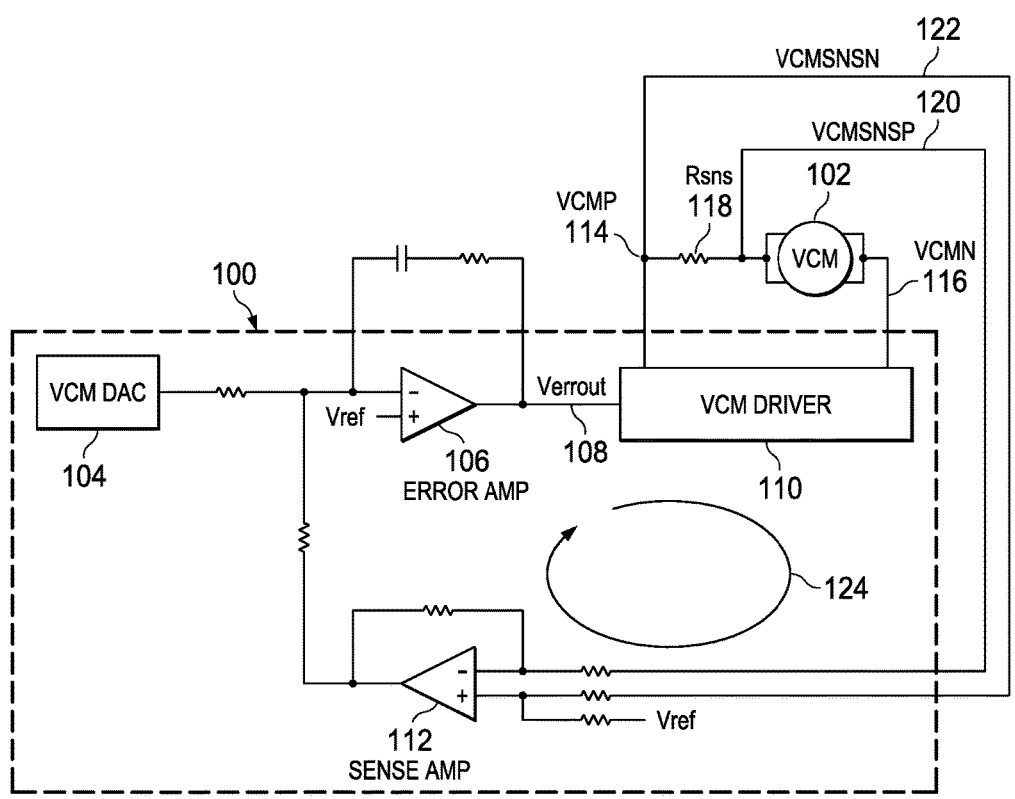
FIG. 1 is an illustration of an example hard disk drive servo circuit including a voice coil motor current control loop.

Hard Disk Drive (HDD) servo circuits are designed to drive a voice coil motor (VCM). HDD circuits include an H-bridge, which consists of four power transistors and a voice coil motor load, to control the VCM current (e.g., the current through a VCM). The current through the VCM (e.g., Ivcm) drives an actuator head along HDD tracks (e.g., physical divisions of data on a disk drive) to read and/or write data in a HDD. Some HDD servo circuits control the VCM using two modes: linear mode and pulse width modulation (PWM) mode. In PWM mode, a controller enables and/or disables a plurality of switches at different points in time to enable and/or disable particular transistors in the H-bridge of the HDD circuit providing voltage pulses to the VCM. As a result, the current flowing through VCM is a saw-shape waveform, which is not smooth varying. In linear mode, operational amplifiers control the transistors (e.g., via variable resistances) of the H-bridge to provide a smooth varying voltage to the VCM. The linear mode provides more accurate control of the VCM at the expense of additional power consumption. The PWM mode provides less power consumption at the expense of less accurate VCM control. When the HDD servo circuit drives a VCM to search an HDD track, the PWM mode may be used to conserve power. When the VCM is close to the target HDD track, the VCM loop may be switched from the PWM mode to the linear mode to accurately seek and follow the track.

During the PWM-to-linear transition, a transition request is synchronized with a clock to initiate the transition at the end of a PWM period. In this manner, the voltage on a node corresponding to the positive side of the VCM (e.g., node VCMP) and the voltage on a node corresponding to the negative side of the VCM (e.g., node VCMN) are low rail (e.g., ground or substantially close to ground). Additionally, the low rail phase status of VCMP and VCMN are the initial conditions for linear mode, which causes linear driver operational amplifiers of the HDD circuit to stay in deep saturation for a substantial duration of time. The linear driver operational amplifiers are not strong enough to quickly recover from deep saturation. Accordingly, the linear driver operational amplifiers are out of control during the deep saturation, thereby causing a current glitch in VCM current (Ivcm), which slows the response time of the PWM-to-linear transition. Examples disclosed herein reduce the current glitch by assisting the linear driver operational amplifiers of the HDD circuit to get out of deep saturation as soon as possible to minimize the current glitch. In this manner, transition from PWM mode to linear mode occurs quickly and efficiently.

Examples disclosed herein include a high-side boost circuit and a low-side boost circuit to assist the linear driver operational amplifiers of the HDD circuit to quickly get out of deep saturation during a PWM-to-linear transition. The low-side boost circuit provides a sufficient voltage drop in the HDD circuit to control low-side transistors in the H-bridge to quickly transition into linear mode. In this manner, the unpredictable operation of the linear driver operational amplifier during saturation is substantially decrease and/or eliminated. Additionally, the high-side boost circuit includes a programmable current mirror to provide up to six times more current to control high-side transistors in the H-bridge to quickly transition into linear mode. In this manner, the unpredictable operation of the linear driver operational amplifier during saturation is substantially decrease and/or eliminated. Using example disclosed herein, the Ivcm current glitch is reduced by at least three times the amount of conventional HDD circuits, thereby causing the PWM-to-linear mode transition to respond four times faster than conventional HDD circuits.

FIG. 1 is a circuit diagram of an example HDD circuit 100 disclosed herein to control an example VCM 102 and provide the example VCM 102 with a smooth PWM-to-linear transition. The example HDD circuit 100 includes an example VCM digital-to-analog converter (DAC) 104, an example error amplifier 106, an example error amplifier output (Verrout) 108, an example VCM driver 110, and an example sense amplifier 112. The example HDD circuit 100 connects (e.g., couples) to an example VCMP node 114 and to an example VCMN node 116 and inputs a current/voltage from an example VCM sense-positive (VCMSNSP) node 120 and from an example VCM sense-negative (VCMSNSN) node 122, creating an example feedback loop 124. The example VCMSNSP node 120 and the example VCMSNSN node 122 determine a sense current across an example sense resistor (Rsns) 118.

The example VCM 102 of FIG. 1 drives an HDD actuator head to read/write data based on the current that flows through the example VCM 102. The example VCM 102 may operate in linear mode or PWM mode. In linear mode, the current flowing through the example VCM 102 varies smoothly to provide a more accurate control, higher power operation of an HDD actuator head. In PWM mode, the current flowing through the example VCM 102 is a saw-shape because the voltage across VCM is pulsed to reduce energy consumption; but provides a reduced accurate ability to control the HDD actuator head.

The example VCM DAC 104 of FIG. 1 provides a loop current command. The loop current command is a signal corresponding to a desired current to flow through the example VCM 102 to drive the example VCM 102 (e.g., the velocity and position of movement on a disk surface). As further described below, the output of the VCM DAC 104 is combined with an output of the example sense amplifier 112 and inputted into the example error amplifier 106.

The example error amplifier 106 is an operational amplifier configured as an integrating operational amplifier. The example error amplifier 106 compares a reference voltage to the combination of the output of the example VCM DAC 104 and the output of the example sense amplifier 112 (e.g., the difference between the VCM DAC output and the sense amplifier output) to integrate any difference between the target loop current command from the example VCM DAC 104 and the actual current through the example VCM 102. The example Verrout 108 is the integrated difference. In this manner, the example Verrout 108 is applied to the example VCM driver 110 so that the actual current through the example VCM 102 substantially corresponds to the loop current command generated by the example VCM DAC 104.

The example VCM driver 110 receives the example Verrout 108 and controls transistors (e.g., power transistors) of an H-bridge to generate current to control the example VCM 102 by outputting a voltage difference between the example VCMP node 114 and the example VCMN node 116. The example VCM driver 110 includes the H-bridge, PWM switches to control the PWM mode, and fully differential amplifiers to control the linear mode. The example VCM driver 110 is further described in conjunction with FIG. 2.

The example sense amplifier 112 receives the voltage at the example VCMSNSP node 120 and the voltage at the example VCMSNSN node 122. As described above, the voltage difference between the example VCMSNSP node 120 (e.g., the example VCMP node 114) and the example VCMSNSN node 122 corresponds to the actual current through the example VCM 102 and the example Rsns 118 (e.g., $$Ivcm = \left(\frac{VCMSNSP - VCMSNSN}{Rsns}\right).$$

The example sense amplifier 112 amplifies the difference (e.g., corresponding to Ivcm) by some gain. The output of the example sense amplifier 112 (e.g., the amplified difference corresponding to Ivcm) is subtracted from the output of the example VCM DAC 104 to provide the example feedback loop 124 so that the loop current command substantially matches the current through the example VCM 102 (e.g., Ivcm).

Figure 2:
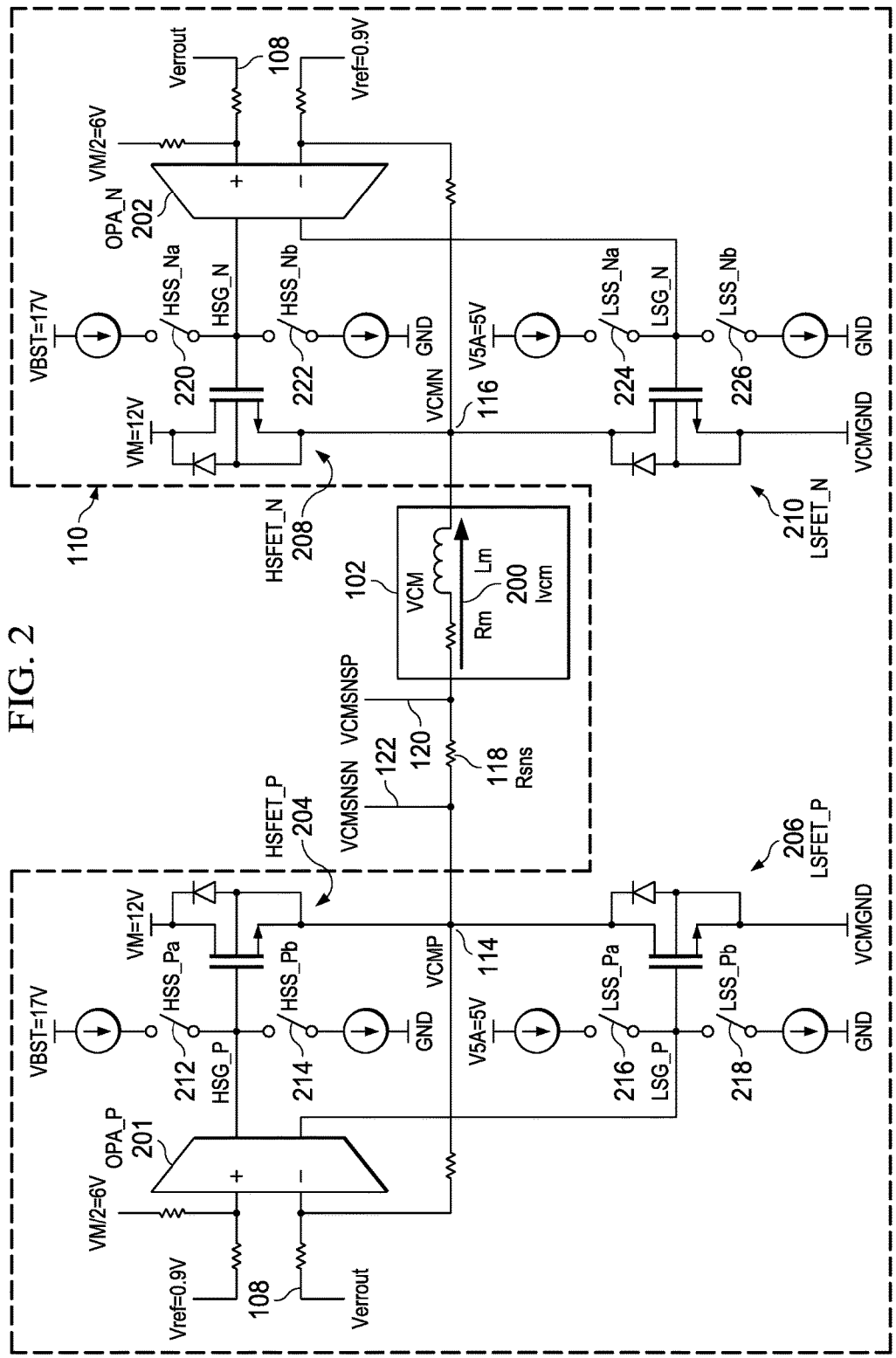
FIG. 2 is an example circuit diagram of a voice coil motor driver of FIG. 1.

FIG. 2 is an example circuit diagram of the example VCM driver 110 of FIG. 1, disclosed herein, to control the example VCM 102 using an example Ivcm 200 and provide the example VCM 102 with a smooth PWM-to-linear transition. The example VCM driver 110 is coupled to the example VCM 102, the example Verrout 108, the example Rsns 118, the example VCMSNSP node 120, and the example VCMSNSN node 122 of FIG. 1. The example VCM driver 110 includes a positive-side fully differential operational amplifier (OPA_P) 201, an example negative-side fully differential operational amplifier (OPA_N) 202, an example positive high side field effect transistor (HSFET_P) 204, an example positive low side field effect transistor (LSFET_P) 206, an example negative high side field effect transistor (HSFET_N) 208, an example negative low side field effect transistor (LSFET_N) 210, example positive high side switches (HSS_Pa, HSS_Pb) 212, 214, example positive low side switches (LSS_Pa, LSS_Pb) 216, 218, example negative high side switches (HSS_Na, HSS_Nb) 220, 222, and example negative low side switches (LSS_Na, LSS_Nb) 224, 226.

The example VCM driver 110 generates the example Ivcm 200 used to control the example VCM 102. The example VCM driver 110 generates the example Ivcm 200 by applying voltages to the gates of the example HSFET_P 204, the example LSFET_P 206, the example HSFET_N 208, and/or the example LSFET_N 210, which make up an H-bridge. Although the illustrated H-bridge transistors are power field effect transistors (PFETs), the H-bridge transistors may be any type of transistor. Each of the H-bridge transistors include a back-gate diode for inductance flyback, as further described in conjunction with FIGS. 3A-3D. As described above, the example Ivcm 200 may be generated in PWM mode and/or in linear mode. In linear mode the example OPA_P 201 and the example OPA_N 202 apply the voltages to the gates of the H-bridge transistors (e.g., HSFET_P 204, LSFET_P 206, HSFET_N 208, and/or LSFET_N 210), so that the H-bridge transistors behave as variable resistances and incorporate with the example VCM 102 to form a resistance divider between VM=12V and VCMGND, to generate the example Ivcm 200. In PWM mode, the example switches 212, 214, 216, 218, 220, 222, 224, 226 are enabled and/or disabled to apply either VBST=17V or VGND=0V to the gates of the H-bridge transistors (e.g., HSFET_P 204, LSFET_P 206, HSFET_N 208, and/or LSFET_N 210), as further illustrated and described in conjunction with FIG. 3A-3D.

In linear mode, the example OPA_P 201 and the example OPA_N 202 control the gates of the H-bridge transistors (e.g., HSFET_P 204, LSFET_P 206, HSFET_N 208, and/or LSFET_N 210) to operate the transistors as resistors. For example, when Ivcm 200 flows from the example VCMP node 114 to the example VCMN node 116, the example LSFET_P 206 and the example HSFET_N 208 are turned off, thereby creating a very large resistance. At the same time, the example HSFET_P 204 and the example LSFET_N 210 are controlled to have a resistance substantially similar to the example Rsns 118 and the resistance of the example VCM 102 (e.g., Rm), thereby creating a path from VM to ground generating the example Ivcm 200. The example OPA_P 201 and the example OPA_N 202 control the resistance of the example HSFET_P 204 and the example LSFET_N 210 based on the example feedback loop 124 of FIG. 1 until the Ivcm 200 matches the loop current command of the example VCM DAC 104 (FIG. 1). The example Ivcm 200 corresponds to Equation 1:

$$i_{VCM(t)} = i_{VCM(t0)} + \frac{1}{L_M} \int_{t0}^{t} [VM - i_{VCM(t)}(R_{HSFET\_P} + R_M + R_{sns} + R_{LSFET\_N})]dt \quad \text{(Equation 1)}$$

Where $L_M$ is the inductance of the VCM 102, VM is the supply voltage, $R_{HSFET\_P}$ is the resistance of the HSFET_P 204, Rm is the resistance of the VCM 102, Rsns is the resistance of sense resistor 118, and RLSFET_N is the resistance of the LSFET_N 210.

In linear mode, the two phases of the VCM 102, corresponding to the voltage swings at the example VCMP node 114 and the example VCMN node 116, may be controlled to be centered at VM/2. The advantage to linear mode is the loop current is substantially smoothly varying providing accurate control of the example VCM 102. However, a large amount of power is dissipated in the H-bridge power transistors during linear mode causing lower efficiency. Power is conserved during PWM mode. The operation of PWM mode is further described in conjunction with FIGS. 3A-3D.

Figures 3A, 3B:
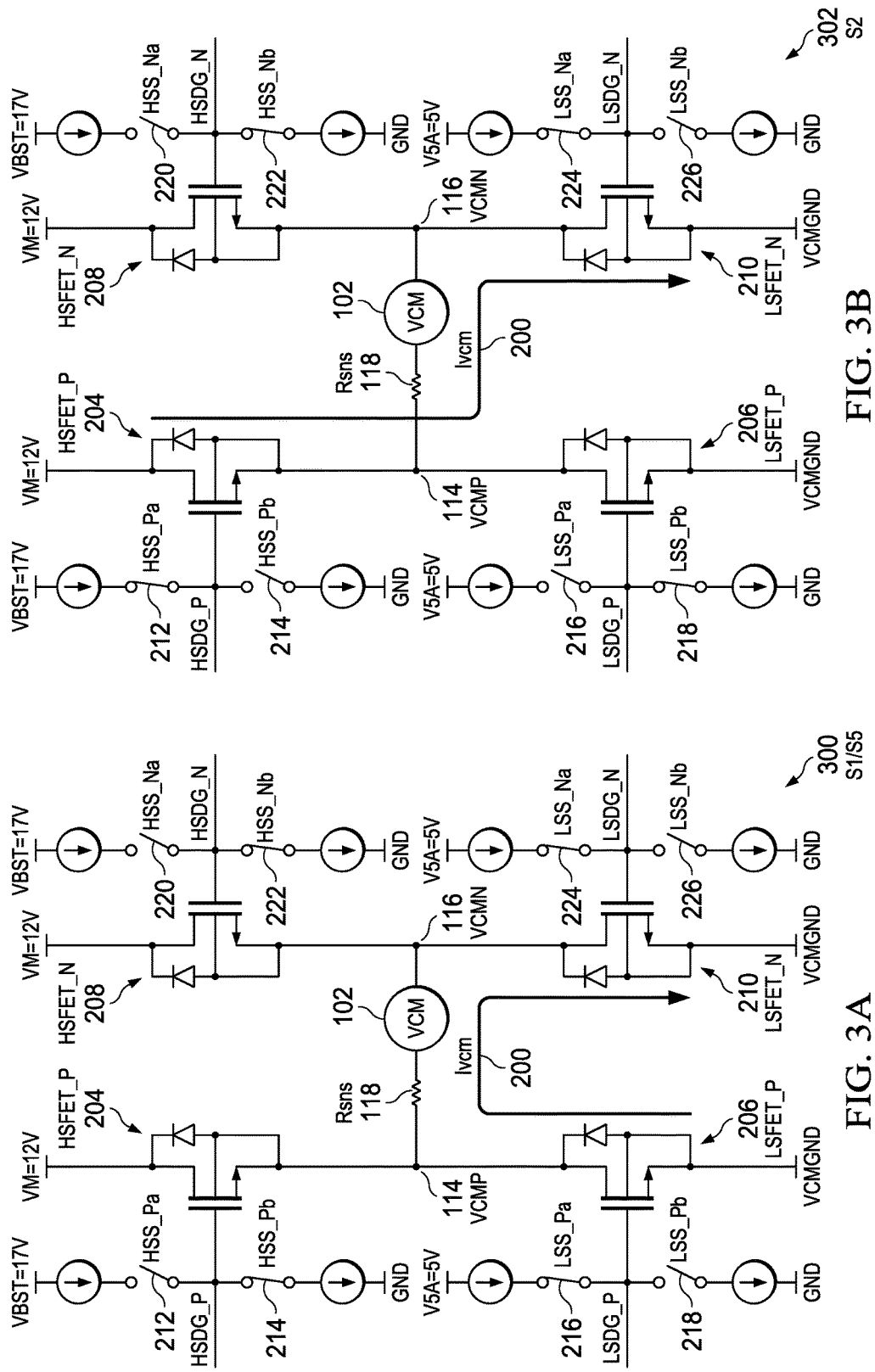

FIGS. 3A-3D illustrate operation of the H-bridge in the example VCM driver 110 of FIG. 2 in PWM mode based on a current flowing in a first (e.g., positive) direction (e.g. from the example VCMP node 114 to the example VCMN node 116). FIG. 3A illustrates an example first state (S1)/an example fifth state (S5) 300 of the PWM mode, FIG. 3B illustrates an example second state (S2) 302 of the PWM mode, FIG. 3C illustrates an example third state (S3) 304 of the PWM mode, and FIG. 3D illustrates an example fourth state (S4) 306 of the PWM mode. FIGS. 3A-3D include the example VCM 102, the example VCMP 114, the example VCMN 116, the example Rsns 118, the example Ivcm 200, the example HSFET_P 204, the example LSET_P 206, the example HSFET_N 208, the example LSFET_N 210, the example positive high side switches (HSS_Pa, HSS_Pb) 212, 214, the example positive low side switches (LSS_Pa, LSS_Pb) 216, 218, the example negative high side switches (HSS_Na, HSS_Nb) 220, 222, and the example negative low side switches (LSS_Na, LSS_Nb) 224, 226 of FIG. 2.

As described above, in PWM mode, the example OPA_P 201 and the example OPA_N 202 of FIG. 2 are disabled and control of the H-bridge depends on the example switches 212, 214, 216, 218, 220, 222, 224, 226. As illustrated in the example states S1/S5 300 of FIG. 3A, the example HSS_Pa 212 is disabled, the example HSS_Pb 214 is enabled, the example HSS_Na 220 is disabled, and the example HSS_Nb 222 is enabled, providing a ground voltage to the gate of the example HSFET_P 204 and to the gate of the example HSFET_N 208. The ground voltage disables the example HSFET_P 204 and the example HSFET_N 208 causing VM to be cut off from the example VCMP node 114 and the example VCMN node 116. Additionally, the example LSS_Pa 216 is enabled, the example LSS_Pb 218 is disabled, the example LSS_Na 224 is enabled, and the example LSS_Nb 226 is disabled, providing a V5A voltage (e.g., a high voltage (5V)) to the gate of the example LSFET_P 206 and to the gate of the example LSFET_N 210. The high voltage enables the example LSFET_P 206 and the example LSFET_N 210 causing the example VCMP node 114 and the example VCMN node 116 to be coupled to ground, thereby decaying (e.g., reducing) the example Ivcm 200 through the example VCM 102, as further illustrated in the example S1/S5 300 of FIG. 5. The amount of decay of the example Ivcm 200 is a function of time, as shown in Equation 2:

$$i_{VCM(S1t)} = i_{VCM(S1t0)} + \frac{1}{L_M} \int_{S1t0}^{S1t} [-i_{VCM(t)}(R_{dson,LSFET} + R_{SNS} + R_M + R_{dson,LSFET})]dt \quad \text{(Equation 2)}$$

Where $R_{dson,LSFET\_P}$ is the resistance of the LSFET_P 206 when enabled and $R_{dson,LSFET\_N}$ is the resistance of the LSFET_N 210 when enabled.

As illustrated in the example states S2 302 and the example state S4 306 of FIGS. 3B and 3D, the example LSS_Pa 216 is disabled, the example LSS_Pb 218 is enabled, the example HSS_Na 220 is disabled, and the example HSS_Nb 222 is enabled, providing a ground voltage to the gate of the example LSFET_P 206 and to the gate of the example HSFET_N 208. The ground voltage disables the example LSFET_P 206 and the example HSFET_N 208. Additionally, the example HSS_Pa 212 is enabled, the example HSS_Pb 214 is disabled, the example LSS_Na 224 is enabled, and the example LSS_Nb 226 is disabled, providing a VBST voltage (e.g., a high voltage (17V)) to the gate of the example HSFET_P 204 and providing the V5A voltage (e.g., the high voltage (5V)) to the gate of the example LSFET_N 210. The high voltage enables the example HSFET_P 204 and the example LSFET_N 210 causing the example VCMP node 114 to be coupled to VM (e.g., 12V) and the example VCMN node 116 to be coupled to ground causing a large voltage drop across the example VCM 102, thereby increasing the example Ivcm 200 through the example VCM 102, as further illustrated in the example S2 302 and/or the example S4 306 of FIG. 5. The amount of increase of the example Ivcm 200 is a function of time, as shown in Equation 3:

$$i_{VCM(S2t)} = i_{VCM(S2t0)} + \frac{1}{L_M} \int_{S2t0}^{S2t} [VM - i_{VCM(S2t)}(R_{dson,HSFET\_P} + R_{SNS} + R_M + R_{dson,LSFET\_N})]dt \quad \text{(Equation 3)}$$

Where $R_{dson,HSFET\_P}$ is the resistance of the HSFET_P 204 when enabled and $R_{dson,LSFET\_N}$ is the resistance of the LSFET_N 210 when enabled. Alternatively, the example VCM driver 110 may generate the example Ivcm 200 to flow in the opposite (e.g., negative) direction (e.g., from the example VCMN node 116 to the example VCMP node 114). In such an example, the state S2 302 and the state S4 306 may be configured to enable the example HSFET_N 208 and the example LSFET_P 206 and disable the example HSFET_P 204 and the example LSFET_N 210 to generate the example Ivcm 200 in the opposite direction.

As illustrated in the example state S3 304 of FIG. 3C, the example LSS_Pa 216 is disabled, the example LSS_Pb 218 is enabled, the example LSS_Na 224 is disabled, and the example LSS_Nb 226 is enabled, providing a ground voltage to the gate of the example LSFET_P 206 and to the gate of the example LSFET_N 210. The ground voltage disables the example LSFET_P 206 and the example LSFET_N 210. Additionally, the example HSS_Pa 212 is enabled, the example HSS_Pb 214 is disabled, the example HSS_Na 220 is enabled, and the example HSS_Nb 222 is disabled, providing the VBST voltage (e.g., a high voltage (17V)) to the gate of the example HSFET_P 204 and the gate of the example HSFET_N 208. The high voltage enables the example HSFET_P 204 and the example HSFET_N 208 causing the example VCMP node 114 and the example VCMN node 116 to be coupled to VM (e.g., 12V) causing a small voltage drop across the example VCM 102, thereby decaying the example Ivcm 200 through the example VCM 102, as further illustrated in the example S3 304 of FIG. 5. The amount of decay of the example Ivcm 200 is a function of time, as shown in Equation 4:

$$i_{VCM(S3t)} = i_{VCM(S3t0)} + \frac{1}{L_M} \int_{S3t0}^{S3t} [-i_{VCM(S3t)}(R_{dson,HSFET\_P} + R_{SNS} + R_M + R_{dson,HSFET\_N})]dt \quad \text{(Equation 4)}$$

Where $R_{dson,HSFET\_P}$ is the resistance of the HSFET_P 204 when enabled and $R_{dson,HSFET\_N}$ is the resistance of the HSFET_N 208 when enabled.

Figure 5:
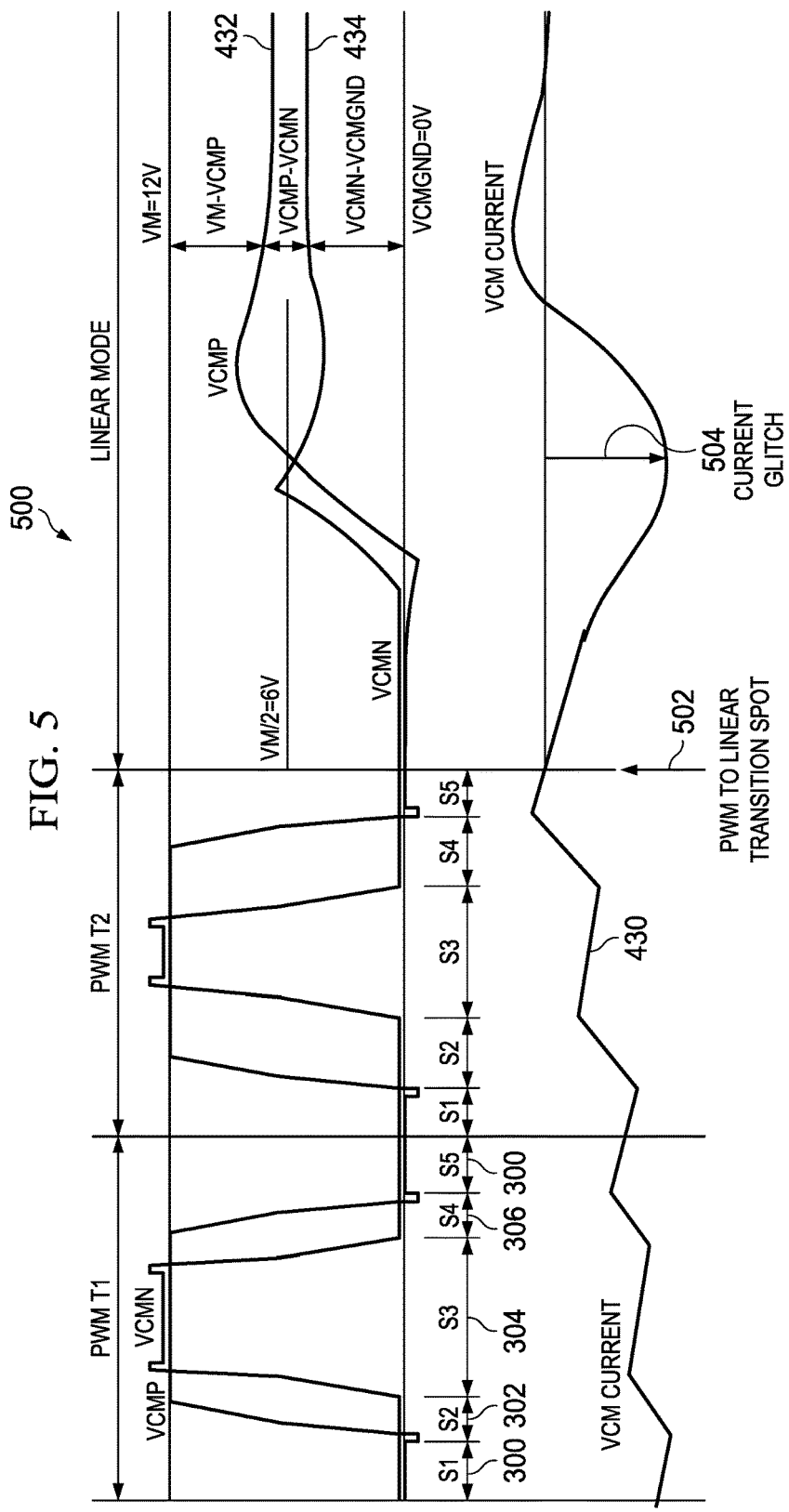
FIG. 5 is a graph of a transition response of the conventional voice coil motor driver of FIG. 4 from a pulse width modulation mode to a linear mode.

In operation, the example switches 212, 214, 216, 218, 220, 222, 224, 226 are enabled/disabled according to the illustrations of the example FIGS. 3A-3D (e.g., from FIG. 3A to FIG. 3B to FIG. 3C to FIG. 3D and back to FIG. 3A) to repeatedly increase the example Ivcm 200 and decrease the example Ivcm 200, as further illustrated in FIG. 5. In this manner, during the PWM operation mode, the example power transistors 204, 206, 208, 210 are either fully enabled (e.g., fully turned on and the voltage drops on these transistors are much smaller than the voltage drops on the load VCM 102 corresponding to very small power dissipation on the power transistors) or fully disabled (e.g., fully turned off and no current flows through corresponding to no power dissipation). Accordingly, a very small portion of power is dissipated through the example transistors 204, 206, 208, 210 and most of the power is delivered to example load VCM 102. The example Ivcm 200 is controlled with the PWM duty cycle, that is, the percentage of VCM on-time (the sum of the durations of time corresponding to states S2/S4) over the whole PWM period time (S1+S2+S3+S4+S5). To enlarge the example Ivcm 200, the VCM on-time is increased. To reduce the example Ivcm 200, the VCM on-time is decreased. In some examples, while transitioning between states, there is a short duration of time where the example transistors 204, 206, 208, 210 are all disabled for a short duration of time to guarantee prevention of a shoot-through directly from VM=12V to ground. During such transitions, the back-gate diode of the example transistors 204, 206, 208, 210 may be enabled to let load current flow (e.g., providing inductance fly-back). Such load current may create small distortions (e.g., humps) in the voltages at the example VCMP node 114 and/or the example VCMN node 116, as illustrated in FIG. 5.

Figure 4:
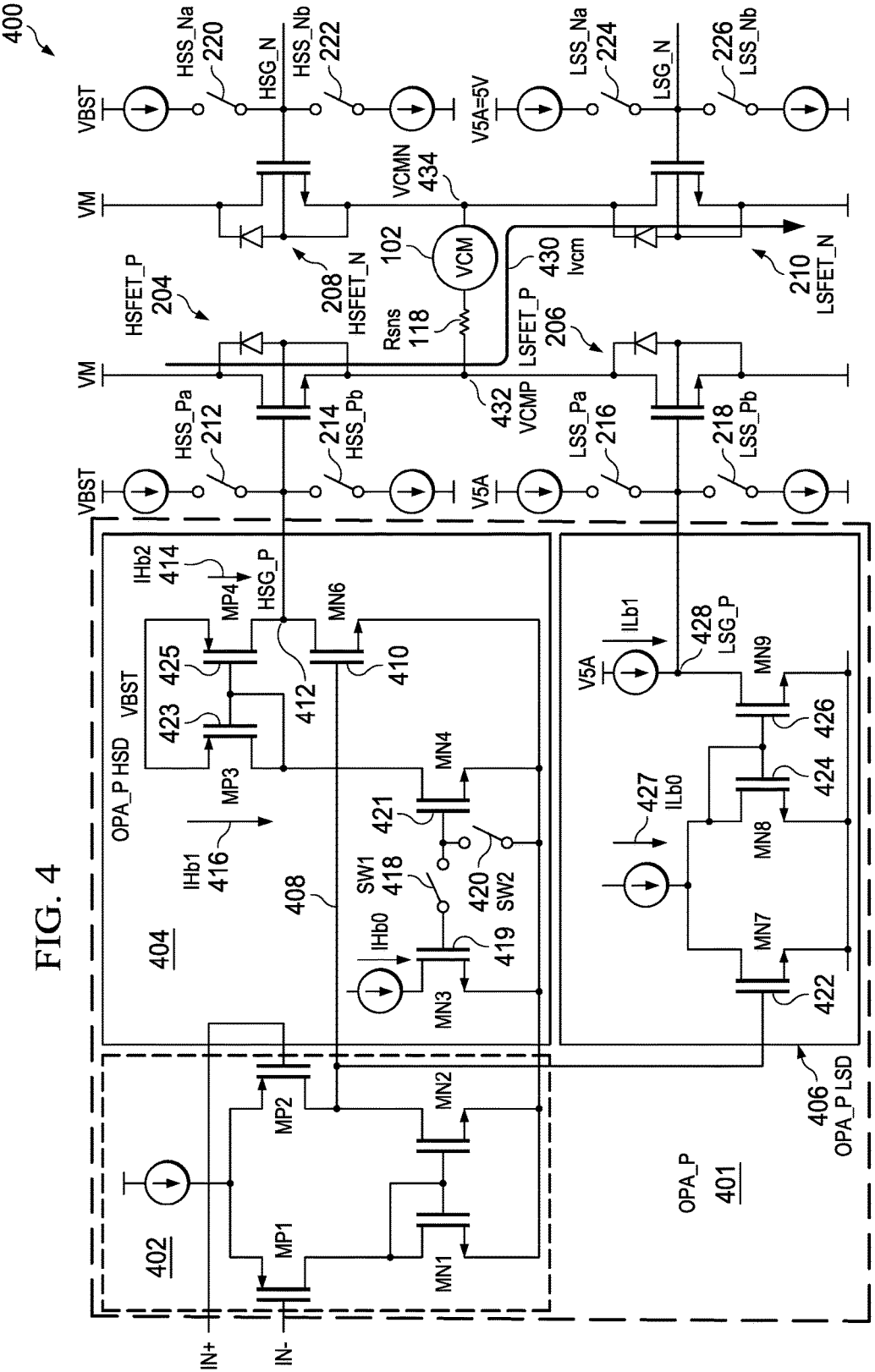
FIG. 4 is an example circuit diagram of a positive side of a conventional voice coil motor driver.

FIG. 4 is an example circuit diagram of a section of an example traditional VCM driver 400 including an example traditional OPA_P 401. The example traditional VCM driver 400 may be operated in conjunction with the example HDD circuit 100 of FIG. 1. The example traditional VCM driver 400 includes the example VCM 102, the example Rsns 118, the example HSFET_P 204, the example LSFET_P 206, the example HSFET_N 208, the example LSFET_N 210, the example positive high side switches (HSS_Pa, HSS_Pb) 212, 214, the example positive low side switches (LSS_Pa, LSS_Pb) 216, 218, the example negative high side switches (HSS_Na, HSS_Nb) 220, 222, and the example negative low side switches (LSS_Na, LSS_Nb) 224, 226 of FIG. 2. The example traditional VCM driver 400 further includes the example OPA_P 401, an example OPA_P first stage 402, an example OPA_P high side second stage (OPA_P HSD) 404, and example OPA_P low side second stage (OPA_P LSD) 406, an example first side output node 408, example transistors (MN3, MN4, MN6, MN7, MN8, MN9, MP3, MP4) 410, 419, 421, 422, 423, 424, 425, 426, an example high side gate output (HSG_P) 412, example high side currents (IHb1, IHb2, ILb0) 414, 416, 427 example switches 418, 420, and an example low side gate output (LSG_P) 428, and the example conventional Ivcm 430.

During a PWM-to-linear transition, a transition request is synchronized with a clock signal to transition from PWM mode to linear mode after the current whole PWM period sequence is complete (e.g., when the example VCMP node 432 and the example VCMN node 434 are grounded, as described above in conjunction with FIG. 3A). The transition request includes enabling the example switch SW1 418 and disabling example SW2 420 to enable the example biasing currents of the example OPA_P HSD 414 to flow via a current mirror(s) (e.g., via the connections of the example transistors MN3 419, MN4 421, MP3 423, and MP4 425 in the example OPA_P HSD 404), causing a voltage rise at the example HSG_P node 412 (e.g., in an attempt to enable the example HSFET_P 204 for linear mode). When the example traditional VCM driver 400 transitions from PWM mode to linear mode, both the example VCMP node 432 and the example VCMN node 434 are tied to ground (e.g., at low rail phase). The low rail phase between the VCMP node 432 and the example VCMN node 434 are fed back to the example OPA_P 401 (e.g., as Verrout 108 from the feedback loop 124 of FIG. 1). Because Verrout 108 is coupled to an inverting input (IN−), Vref is coupled to a non-inverting input (IN+) of the example traditional OPA_P 401, and the VCMP and VCMN nodes 432, 434 are low rail phase, the voltage at the IN− node will be much lower than the IN+ node, causing the example traditional OPA_P 401 to saturate. Because the voltage at the IN− node is much lower than the voltage at the IN+ node, the example first stage 402 drives the example first stage output 408 as low as possible (e.g., ground). Driving the first stage output 408 to ground disables the MN7 transistor 422 in the OPA_P LSD 406, causing the example ILb0 427 to flow entirely through the example MN8 transistor 424. When the example ILb0 427 flows entirely though the example MN8 transistor 424, the voltage at the gates of the example MN8 transistor 424 and the example MN9 transistor 426 are at their maximum. In response, the example transistor MN9 is fully enabled and attempts to discharge the voltage at the example LSG_P node 428 caused by the example V5A voltage source (e.g., because the example switch LSS_Pa 216 was enabled at the end of the PWM mode, causing V5A to transmit current through the example MN9 transistor 426). However, the example transistor MN9 426 takes a long time to discharge the voltage at the example LSG_P 428 down to a voltage below the gate threshold voltage of the example LSFET_P 206. Because the example power transistor LSFET_P 206 usually has a very large size corresponding to a large gate capacitance and the example traditional OPA_P 401 is designed to operate in a linear region of operation, the example traditional OPA_P 401 is not strong enough to quickly recover from deep saturation.

Similarly, at the transition from PWM mode to linear mode, driving the first stage output 408 to ground disables the MN6 transistor 410 in the OPA_P HSD 404, causing the example IHb2 414 to reach its maximum to increase the voltage at the example HSG_P node 412. However, because the example traditional OPA_P 401 is designed to operate in a linear region of operation, the example IHb2 414 takes a long time to pull up the example HSG_P 412 from ground to a voltage sufficient to enable the example HSFET_P 204 (e.g., because the example HSS_Pb 214 was enabled at the end of the PWM mode, causing the voltage at the example HSG_P 412 to be ground and the example power transistor HSFET_P 204 usually has a large size corresponding to a large gate capacitance). Thus, the example traditional OPA_P 401 is not strong enough to quickly recover from deep saturation. The saturation of the example OPA_P 401 in the example traditional VCM driver 400 takes about twelve microseconds to respond and stabilize the traditional Ivcm 430 for linear mode. Further, the example saturation of the example OPA_P 401 causes a six milliamperes (mA) current glitch on the example Ivcm 430, as further described in conjunction with FIG. 5. The example traditional VCM driver 400 further includes a traditional OPA_N coupled to the negative side of the example traditional VCM driver 400 which is substantially similar to the example OPA_P 401. The traditional OPA_N faces the same saturation problems as the example OPA_P 401.

FIG. 5 illustrates an example graph 500 of a VCM-to-linear transition using the example traditional VCM driver 400 of FIG. 4. The example graph 500 includes the example states S1 300, S2 302, S3 304, S4 306, S5 300 of FIGS. 3A-3D. The example graph 500 further includes the example Ivcm 430, the example VCMP 432, and the example VCMN 434 of FIG. 4. The example graph 500 further includes an example PWM-to-linear transition point 502 and an example current glitch 504.

During the PWM mode, the voltages at the example VCMP node 432 and the example VCMN node 434 pulse based on the configurations of the example states 300, 302, 304, 306 to control the example Ivcm 430. For example, as previously described in conjunction with FIGS. 3B and 3D, when the example HSFET_P 204 and the example LSFET_N 210 are enabled (e.g., during state S2 302 and state S4 306), the example Ivcm 430 increases. When both HSFET_P 204 and HSFET_N 208 or when both LSFET_P 206 and LSFET_N 210 are enabled, the example Ivcm 430 decays. Thus, the example Ivcm 430 changes, as described in conjunction with Equations 2-4 and displays a saw-shape waveform. When the example PWM-to-linear transition point 502 occurs, the voltage at the example VCMP node 432 and the voltage at the example VCMN node 434 begin to act erratically for a duration of time (e.g., 12 microseconds) due to the deep saturation of the example traditional OPA_P 401 and the OPA_N of the example traditional VCM driver 400 before finally settling. Such erratic behavior causes the example current glitch 504 in the example Ivcm 430.

Figure 6:
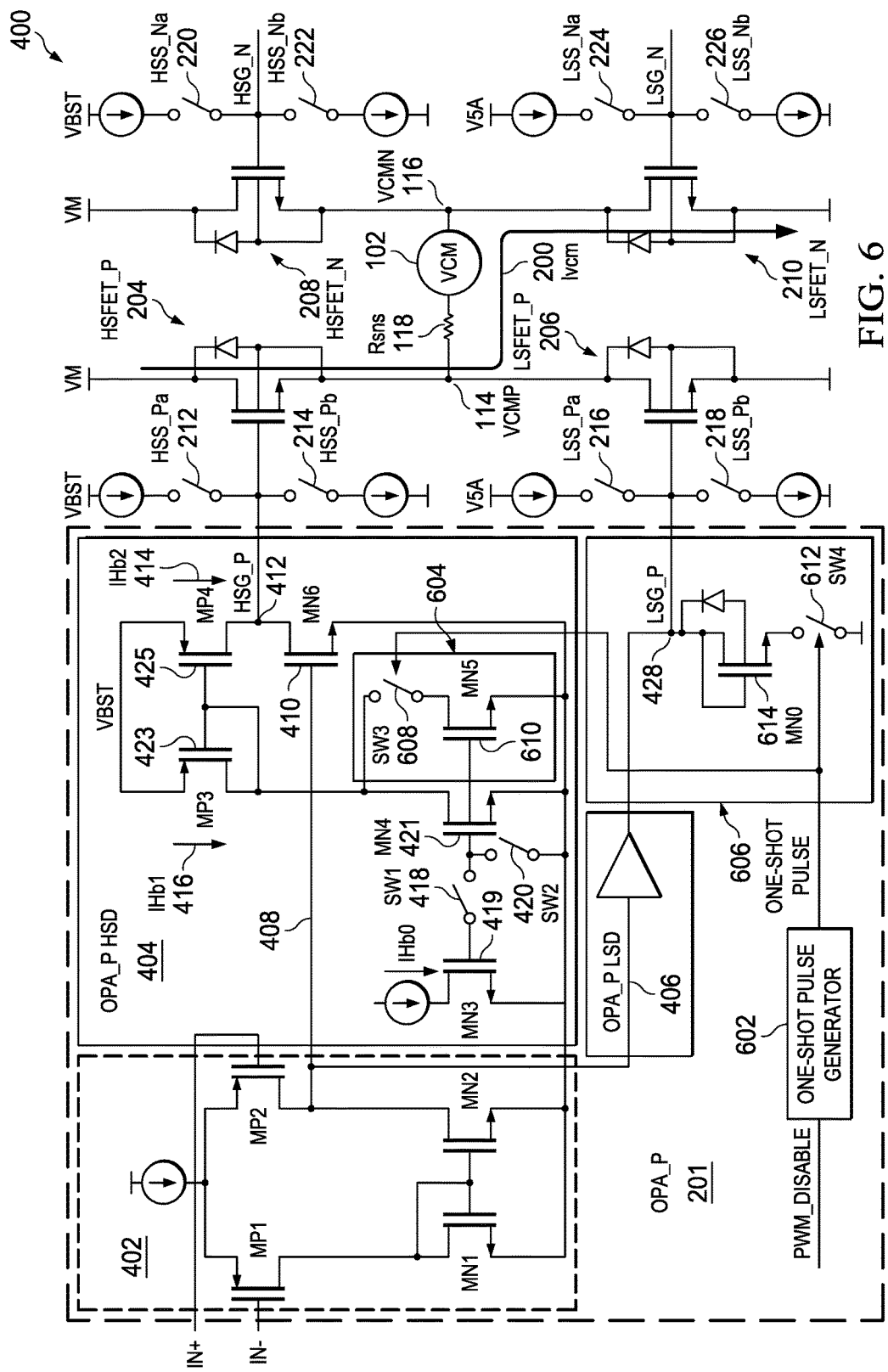
FIG. 6 is an example circuit diagram of a positive side of the voice coil motor driver of FIG. 1 including an example operational amplifier of FIG. 2.

FIG. 6 is a circuit diagram of a section of the example VCM driver 110 including the example OPA_P 201 of FIG. 2. The example VCM driver 110 includes the example VCM 102, the example VCMP 114, the example VCMN 116, the example Rsns 118, the example Ivcm 200, the example HSFET_P 204, the example LSFET_P 206, the example HSFET_N 208, the example LSFET_N 210, the example positive high side switches (HSS_Pa, HSS_Pb) 212, 214, the example positive low side switches (LSS_Pa, LSS_Pb) 216, 218, the example negative high side switches (HSS_Na, HSS_Nb) 220, 222, and the example negative low side switches (LSS_Na, LSS_Nb) 224, 226, the example first stage 402, the example OPA_P high side second stage (OPA_P HSD) 404, and the example OPA_P low side second stage (OPA_P LSD) 406, the example first side output node 408, the example transistor (MN6) 410, the example high side gate output (HSG_P) 412, the example high side currents (IHb1, IHb2) 414, 416, the example switches 418, 420, and the example low side gate output (LSG_P) 428 of FIG. 4. The example VCM driver 110 further includes an example one-shot pulse generator 602, an example high side boost circuit 604, and an example low side boost circuit 606. The example high side boost circuit 604 includes an example switch (SW3) 608 and example transistor MN5 610. The example low side boost circuit 606 includes an example switch (SW4) 612 and an example transistor MN0 614.

The example one-shot pulse generator 602 generates a one-shot pulse (e.g., from a low voltage to a high voltage, staying at the high voltage for a short duration e.g., 0.6 microseconds, then goes down to the low voltage) when PWM mode is disabled. The example one-shot pulse generator 602 may be implemented by hardware, software, and/or firmware. The example one-shot pulse generator 602 receives a PWM disable signal to trigger the generation of the pulse. In some examples, the PWM disable signal may correspond to a transition signal and/or synchronized clock that triggers a transition from PWM mode to linear mode. In some examples, the PWM disable signal further corresponds to a direction of flow of the example Ivcm 102. In such examples, when the example Ivcm 200 is positive (e.g., flowing from the example VCMP node 114 to the example VCM node 1116), the PWM disable triggers the output of the one-shot pulse from the example one-shot pulse generator 602. When the Ivcm 200 is negative, the PWM disable signal may not trigger the one-shot pulse and a second PWM disable signal may trigger a second one-shot pulse from a second one-shot pulse generate on the negative side of the H-bridge. The second one-shot pulse is a negative side one-shot pulse generator that outputs the second one-shot pulse to enable a second high boost circuit and a second low boost circuit on the negative side in a substantially similar manner as the positive side, thereby providing smooth PWM-to-linear mode transition when the example Ivcm 200 is negative. The output of the example one-shot pulse generator 602 (e.g., the one-shot pulse) activates the example high side boost circuit 604 and the example low side boost circuit 606 which the output is high (e.g., during the pulse) by closing the example switch SW3 608 and the example switch SW4 612.

When the example switch SW3 608 is closed (e.g., when the example one-shot pulse generator 602 outputs a pulse), the example transistor MN5 610 couples to the example transistor MN4 421 in parallel. By adding the example MN5 transistor 610, the example MN5 transistor 610 provides five times more current to the example IHB1 416. Thus, six times more current is added to the example IHb2 414 via the current mirror formed by the example transistors MP3 423 and MP4 425. The additional current allows the example HSG_P 412 to charge up (e.g., from ground to the trigger voltage of the gate of the example HSFET_P 204) during the transition to enable the example HSFET_P 204 to more quickly initiate linear mode then the example conventional VCM driver 400. When the example one-shot pulse generator 602 is outputting a low voltage (e.g., not during a PWM-to-linear transition), the example switch SW3 608 is disabled.

In the low side boost circuit 606, when the example switch SW4 is closed (e.g., when the example one-shot pulse generator 602 outputs a pulse), the example transistor MNO 614 provides an additional path from the example LSG_P node 428 to ground. The example transistor MNO 614 is a substantially similar type transistor to the example LSFET_P 206 (e.g., a PFET with a back-gate diode). When the example switch SW4 612 closes, the voltage at LSG_P 428 discharges to ground through the example transistor MNO 614 creating a voltage drop across the example transistor MNO 614. The voltage drop quickly pulls down the example LSFET_P 206 to the threshold level of LSFET_P 206 to initiate linear mode. When the example one-shot pulse generator 602 is outputting a low voltage (e.g., not during a PWM-to-linear transition), the example switch SW4 612 is disabled. Although in the illustrated example, the example low side boost circuit 606 coupled to the example OPA_P LSD 406, the example low side boost circuit 606 may be embedded within the example OPA_P LSD 406. Additionally, the example OPA_N 202 also includes a second pulse generator, a second high side boost circuit, and a second low side boost circuit to help the example OPA_N 202 control the example HSFET_N 208 and the example LSFET_N 210 on the negative side of the example VCM driver 110 during a PWM-to-linear transition when the Ivcm 200 is negative (e.g., flowing from the example VCMN node 116 to the example VCMP node 114).

FIG. 7 is an example comparison 700 of a response to a PWM-to-linear transition from the example traditional VCM driver 400 of FIG. 4 and the example VCM driver 110 of FIGS. 1, 2, and 6. The example comparison 700 includes the example VCMP 114, the example VCMN 116, and the example Ivcm 200 of FIGS. 2 and 6. The example comparison 700 further includes the example Ivcm 430, the example VCMP 432, and the example VCMN 434 of the example traditional VCM 400 of FIG. 4. The example comparison 700 further includes an example traditional VCMP-VCMN difference 702, an example VCMP-VCMN difference (e.g., of the example VCM driver 110) 704, and an example one-shot pulse output 706.

Before the PWM-to-linear transition point, the example Ivcm 200 is being generated in PWM mode based on the cycling of the enabling and disabling of the example H-bridge transistors 204, 206, 208, 210 of FIGS. 2 and 6. At the PWM-to-linear point, the example one-shot pulse output 706 pulses for a short duration of time (e.g., 0.6 microsecond). As described above in conjunction with FIG. 7, the one-shot pulse helps the example OPA_P 201 and the example OPA_N 202 to recover from deep saturation substantially faster than traditional VCM drivers (e.g., the example traditional VCM driver 400). For example, as illustrated in the example comparison 700, not only do the example VMCP 114 and the example VCMN 116 respond faster than the example VCMP 432 and the example VCMN 434 of the example traditional VCM driver 400, but the example Ivcm 200 has a significantly less current glitch than the example Ivcm 430 of the example traditional VCM driver 400. Thus, the example VCM driver 110 includes a significantly smoother PWM-to-linear transition than the example traditional VCM driver 400.

From the foregoing, it would be appreciated that the above disclosed method, apparatus, and articles of manufacture provide a smooth transition from a pulse width modulation mode to a linear mode to drive a voice coil motor. Examples disclosed herein include a high side boost circuit and a low side boost circuit that activates at a PWM-to-linear transition. The example high side boost circuit provides additional current to quickly activate an H-bridge transistor during the PWM-to-linear transition. The example low boost circuit provides an additional path to ground to quickly deactivate an H-bridge transistor during the PWM-to-linear transition. The examples disclosed herein significantly reduce current glitches associated with a PWM-to-linear transition of traditional VCM drivers in HDD circuits. Additionally, examples disclosed herein provide a fast PWM-to-linear transition, thereby providing a more efficient VCM driver. Using example disclosed herein, the current glitch can be reduced by at least three times the amount of conventional techniques and the PWM-to-linear transition settles four times faster than conventional techniques.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A voice coil motor driver comprising:
   an operational amplifier having an inverting input, a non-inverting input, a high side first gate output, and a low side second gate output;
   a pulse generator having an input separate from the inverting input and the non-inverting input, and having a pulse output;
   a first boost circuit having a first control input coupled to the pulse output and having a path that is coupled to the first gate output;
   and a second boost circuit having a second control input coupled to the pulse output and having an output path coupled between the second gate output and a circuit ground.

2. The voice coil motor driver of claim 1 including an operational amplifier having:
   (a) a first stage having an output;
   (b) a high side second stage having an input coupled to the output of the first stage and an output coupled to the first gate, the high side second stage including the first boost circuit; and
   (c) a low side second stage having an input coupled to the output of the first stage and an output coupled to the second gate, the low side second stage including the second boost circuit.

3. The voice coil motor driver of claim 2 in which the high side second stage includes a first current path and a second current path, the first boost circuit being coupled to the first current path and the second current path being coupled to the first gate.

4. The voice coil motor driver of claim 3 in which the high side second stage includes a current mirror circuit coupled to the first current path and to the second current path.

5. The voice coil motor driver of claim 2 in which the output path of the second boost circuit is coupled to the output of the low side second stage.

6. A method comprising:
generating a pulse in response to a PWM disable signal when a voice coil motor driver transitions from pulse width modulation mode to linear mode;
when the pulse is generated, increasing a first current being applied to a first gate of a first transistor in an H-bridge, the increase in the first current enabling the first transistor; and
when the pulse is generated, providing an additional path to ground from a node coupled to a second gate of a second transistor of the H-bridge, the path to ground corresponding to a voltage drop that disables the second transistor.

7. The method of claim 6 including, when the voice coil motor driver is operating in linear mode, enabling the first transistor and disabling the second transistor.

8. The method of claim 6, in which the first transistor is disabled and the second transistor is enabled prior to the pulse width modulation mode to linear mode transition.

9. The method of claim 6 including:
receiving a signal corresponding to the pulse width modulation mode to linear mode transition; and generating the pulse based on the signal.

10. The method of claim 6 including:
when the pulse is a first voltage, closing a switch; and
when the pulse is a second voltage different than the first voltage, opening the switch; and
when the switch is closed, generating a second current, the second current being applied to a current mirror to increase the first current.

11. The method of claim 6 including when the pulse is a first voltage, closing a switch; and
when the pulse is a second voltage different than the first voltage, opening the switch;
when the switch is closed, discharging a node voltage at the node; and
when the node voltage discharges at the node, creating the voltage drop across a diode.

12. The method of claim 6, in which the pulse is a first pulse, further including:
generating a second pulse when the voice coil motor driver transitions from pulse width modulation mode to linear mode;
when the second pulse is generated, increasing a second current being applied to a third gate of a third transistor in the H-bridge, the increase in the second current enabling the third transistor;
and when the second pulse is generated, providing a second additional path to ground from a second node coupled to a fourth gate of a fourth transistor of the H-bridge, the path to ground corresponding to a voltage drop that disables the fourth transistor.

13. The method of claim 12, in which:
the enabling of the first transistor and the fourth transistor generates a first voice coil motor current, the first voice coil motor current to control a voice coil motor; and
the enabling of the second transistor and the third transistor generates a second voice coil motor current flowing in an opposite direction to the first voice coil motor current, the second voice coil motor current to control the voice coil motor.

14. The method of claim 13 including:
outputting the first pulse when the voice coil motor is to be controlled by the first voice coil motor current; and
outputting the second pulse when the voice coil motor is to be controlled by the second voice coil motor current.

15. A voice coil motor driver comprising:
(a) a high side stage having a first gate output;
(b) a first boost circuit having a pulse input and having a first path coupled to the first gate output, the first path being coupled between a supply voltage and circuit ground;
(c) a low side stage having a second gate output;
(d) a second boost circuit having a pulse input and having a second path coupled to the second gate output, the second path being coupled between the second gate output and circuit ground; and
(e) a pulse generator having an input and a pulse output coupled to the pulse input of the first boost circuit and to the pulse input of the second boost circuit.

16. The voice coil motor driver of claim 15 in which the high side stage includes a current mirror circuit coupled to a first current path and to a second current path, the first path of the first boost circuit being coupled to the first current path and the second current path being coupled to the first gate output.

17. The voice coil motor driver of claim 15 in which:
(a) the first boost circuit includes a series coupled switch and transistor and the switch is coupled to the pulse input; and
(b) the second boost circuit includes a series coupled switch and transistor and the switch is coupled to the pulse input.

18. The voice coil motor driver of claim 15 including an H bridge circuit coupled to the first gate output and to the second gate output.

* * * * *